United States Patent

Sherlock et al.

(10) Patent No.: US 7,735,222 B2
(45) Date of Patent: Jun. 15, 2010

(54) APPARATUS TO REMOVE MATERIAL FROM A TURBINE WHEEL IN-SITU

(75) Inventors: Graham David Sherlock, Greenville, SC (US); Paul Lawrence Kalmar, Zirconia, NC (US)

(73) Assignee: General Electric Company, Schenectady, NY (US)

( * ) Notice: Subject to any disclaimer, the term of this patent is extended or adjusted under 35 U.S.C. 154(b) by 1232 days.

(21) Appl. No.: 11/290,347

(22) Filed: Nov. 30, 2005

(65) Prior Publication Data

US 2006/0156544 A1 Jul. 20, 2006

Related U.S. Application Data

(60) Provisional application No. 60/632,364, filed on Dec. 2, 2004.

(51) Int. Cl.
*B23P 6/00* (2006.01)

(52) U.S. Cl. .................. 29/889.1; 29/889.7; 416/115
(58) Field of Classification Search .............. 29/90.01, 29/402.19, 889.1, 889.7, 714, 709, 81.021; 416/96 A, 115
See application file for complete search history.

(56) References Cited

U.S. PATENT DOCUMENTS

| 3,370,830 | A | 2/1968 | Nickels et al. ........... 253/39.15 |
| 7,029,236 | B2 * | 4/2006 | Marushima et al. ........ 416/96 A |
| 7,032,279 | B2 * | 4/2006 | McCarvill et al. .......... 29/90.01 |
| 7,174,788 | B2 * | 2/2007 | Czerw et al. .................. 73/620 |

* cited by examiner

*Primary Examiner*—Rick K Chang
(74) *Attorney, Agent, or Firm*—Cantor Colburn LLP (57) ABSTRACT

A tool capable of removing material is applied to a turbine wheel cooling slot. Material is removed from a selected portion of the cooling slot with the tool. And, stress concentrations are reduced within the slot through the removal of material.

5 Claims, 7 Drawing Sheets

APPARATUS TO REMOVE MATERIAL FROM A TURBINE WHEEL IN-SITU

CROSS REFERENCE TO RELATED APPLICATION

The present application claims priority under 35 U.S.C. §119(e) to U.S. Provisional Application No. 60/632,364 filed Dec. 2, 2004, which is incorporated herein by reference.

TECHNICAL FIELD

This invention relates generally to removing material from a high stress area of a turbine wheel and more particularly to removing material from a cooling slot of a turbine wheel without removing the turbine wheel from the turbine.

BACKGROUND OF THE INVENTION

In gas turbine engines, fuel is burned within a combustion chamber to produce hot gases of combustion. The gases are expanded within a turbine section producing a gas stream across alternating rows of stationary stator vanes and turbine rotor blades, attached to a turbine wheel, to produce usable power. Gas stream temperatures at the initial rows of vanes and blades commonly exceed 2,000 degrees Fahrenheit. Blades and vanes, susceptible to damage by the hot gas stream, are cooled by air compressed upstream within the engine and flowed to the turbine components. One method for cooling rotating turbine wheels includes injecting cooling air from stationary cavities within the engine to a cooling slot within the turbine wheel for distribution to the interior of the turbine blades.

Air cooling is sometimes not sufficient to prevent low cycle fatigue due to the presence of stress concentrations in the turbine wheel. Overall efficiency in the operation of turbines can be improved by the removal of stress concentrations, thereby reducing stress related damage and in turn reducing downtime of the turbine. The art would be further benefited by the removal of stress concentrations while the turbine wheel is mounted in a turbine.

Prior to the present invention, the utility operator who desired to modify the cooling slots to reduce stress concentrations had essentially two choices: first, the entire rotor could be replaced and, secondly, the turbine wheel could be removed from the turbine to be modified.

Accordingly, a method and apparatus that would allow modification of a turbine wheel cooling slot to remove or reduce stress concentrations, and particularly, a method and apparatus for in-situ modification is desired.

BRIEF SUMMARY OF THE INVENTION

Disclosed herein is a method for removing material from a turbine wheel dovetail slot. A tool is applied to a turbine wheel cooling slot. Material is removed from a selected portion of the cooling slot with the tool. And, stress concentrations are reduced within the slot through the removal of material.

Further disclosed herein is a method for removing debris from a turbine wheel. A seal strip is inserted into a cooling slot within the turbine wheel. A dovetail seal assembly is attached to a first turbine wheel dovetail slot in communication with the cooling slot. Suction is drawn through the dovetail seal assembly. And, debris is evacuated from the cooling slot.

Yet further disclosed herein is a system for removing material from a turbine wheel cooling slot. The system includes a tool, a dovetail seal assembly, and a power tool cover. The tool is capable of removing material. The dovetail seal assembly is in operable communication with the turbine wheel to evacuate debris caused by removing material with the tool. And, the power tool cover is engageable with the wheel and is supportive of the tool.

BRIEF DESCRIPTION OF THE DRAWINGS

Referring to the drawings wherein like elements are numbered alike in the several Figures.

DETAILED DESCRIPTION OF THE INVENTION

Figure 1:
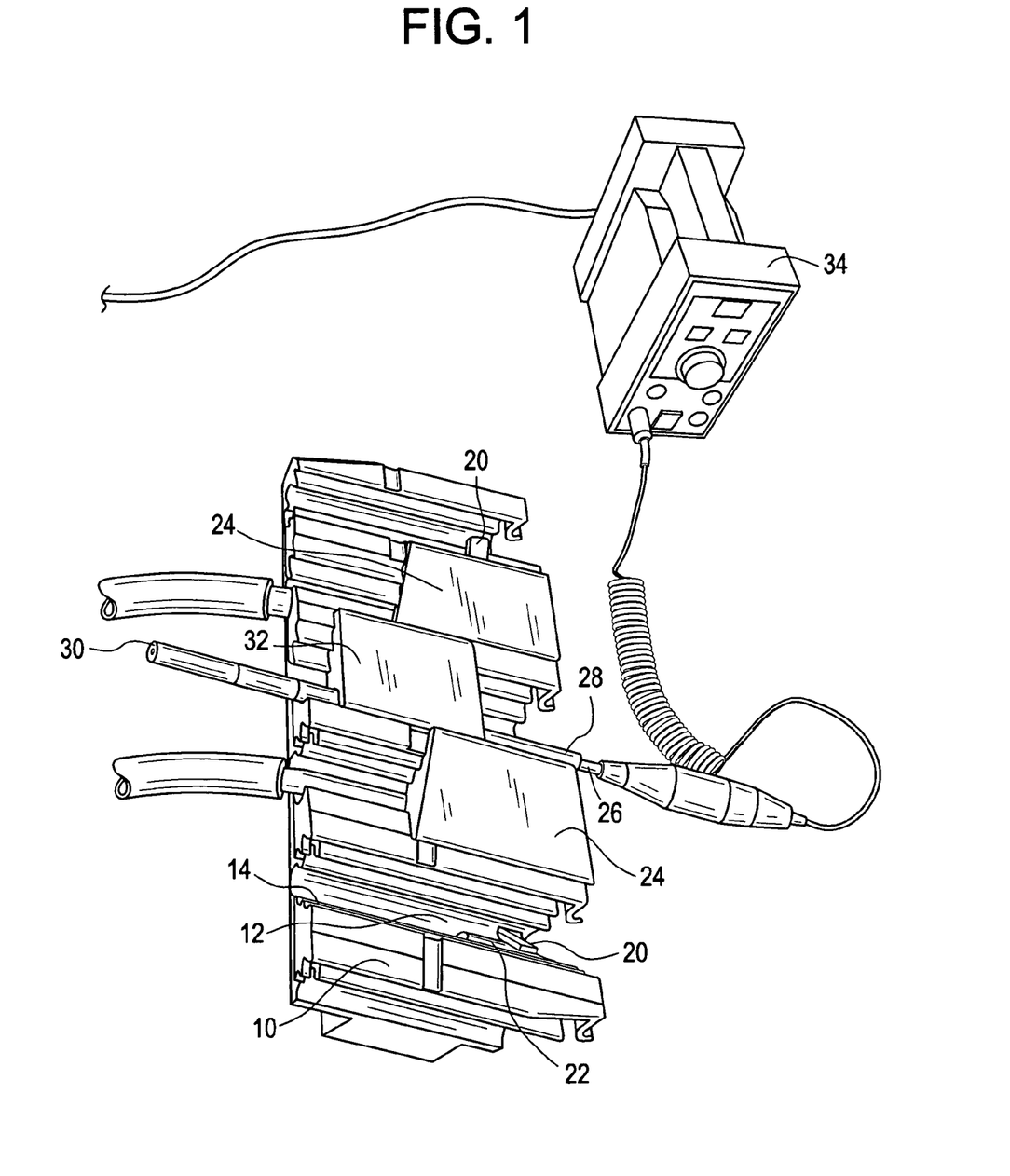
FIG. 1 is a perspective view of a portion of a turbine wheel with components of a system for removing material from a turbine wheel for use in accordance with an embodiment of the invention.

FIG. 1 illustrates a partial section view of a turbine wheel 10 (removed from a turbomachine for clarity) with components of the system illustrated in-situ thereon/in. It will be appreciated that although FIG. 1 illustrates the portion of the wheel outside of its normal installed position, the system and method hereof allows for modification of the turbine wheel in-situ or removed from the turbo-machine as desired. The partial section 10 illustrates a cooling slot 12 (better seen in FIGS. 2 and 6) and a plurality of dovetail slots 14, wherein the cooling slot 12 coincides with the dovetail slots 14 interfacing through exposed edges 16 (better illustrated in FIG. 6). Appended to the partial section 10, for illustrative purposes, are components of the system for removing material from a turbine wheel including a seal strip 20 and a metal shim 18 (shown in FIG. 2) which function together to isolate a cooling slot region, a pair (one shown) of metal pin stoppers 22 to secure the seal strip within the cooling slot, a plurality of dovetail seal assemblies 24 which function to remove debris from the isolated cooling slot region, a hand held power tool 26 suitable for removing (i.e. grinding, blending, dressing, surfacing etc.) material from the turbine wheel 10, a power tool rod 28 and hand piece 30 functioning together to support the hand held power tool 26, a power tool cover 32 which provides radial support to the hand held power tool 26, power tool rod 28, and hand piece 30, and a power supply 34 which furnishes power to the hand held power tool 26. Material is removable from the cooling slot 12 region intermediate contiguous dovetail slots 14 of a turbine wheel 10 using the system and method disclosed herein to remove sharp corners and/or remove material that may contain cracks (or other discontinuities) in various edges present within the cooling slot 12 thus reducing potential stress concentrations. The term stress concentration is defined as a condition in which a stress distribution has high localized stresses. A stress concentration is usually induced by an abrupt change in the shape of a member. Stress concentrations in the vicinity of notches, holes, cracks, or other discontinuities may result in a maximum stress that is several times greater than where there is no geometrical discontinuity.

Figure 2:
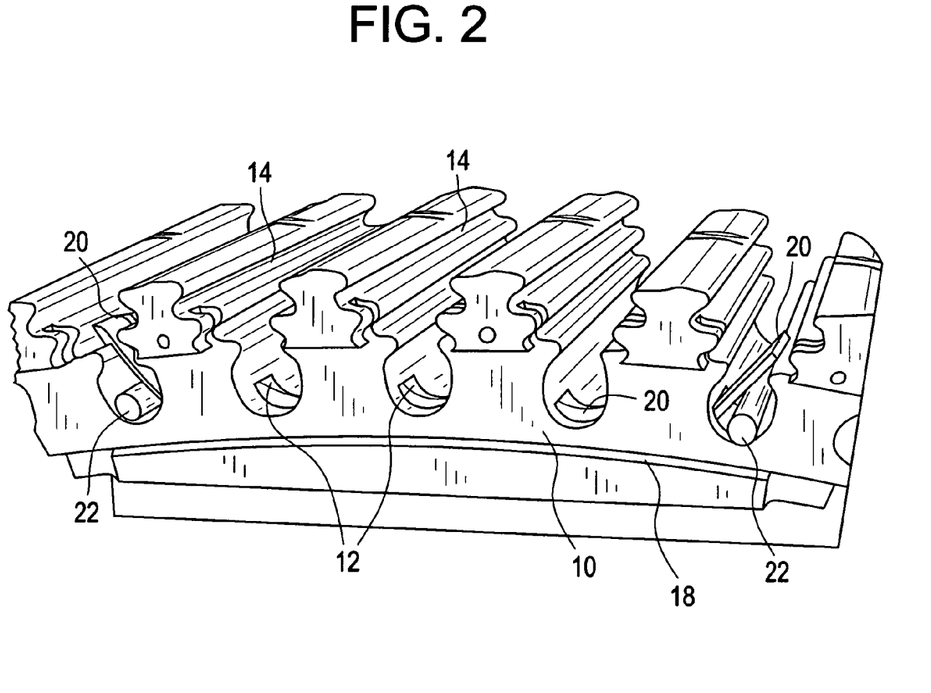
FIG. 2 is another perspective view of the portion of the turbine wheel illustrated in FIG. 1.

FIG. 2 further illustrates the turbine wheel (partial section view) 10, the seal strip 20, the metal shim 18, and the metal pin stoppers 22. The metal shim 18 is inserted along the inner periphery of the turbine wheel 10 adjacent to the cooling slot. The metal shim 18 provides an annular boundary within the cooling slot for proper isolation of the cooling slot region to be modified. The seal strip 20 is then inserted into the turbine wheel cooling slot 12, adjacent the metal shim 18, to seal off the cooling slot region to be modified from the remainder of the cooling slot. Seal strip 20 prevents debris incident the modification process from leaving the slot region being modified and collecting within other regions in the turbine wheel or turbomachine. It is desirable that several seal strips 20, of different width dimensions, be available to accommodate cooling slots 12 which may vary in size due to manufacturing tolerances. Any suitable measurement device may be employed to determine the actual cooling slot 12 width in order to select an appropriately dimensioned seal strip 20 for a cooling slot 12 to be addressed.

Installation of the seal strip 20 into the cooling slot 12 may require the use of a tool to achieve a snug fit between the cooling slot 12 and the metal shim. The tool may be any suitable tool capable of fitting within the cooling slot 12, for example a metal rod having a diameter less than the width of the cooling slot 12, which may be used to apply force to the seal strip 20 to ensure the seal strip 20 is flat against the shim 18. Debris can cause damage to turbomachine components therefore, it is important that the seal strip 20 prevent the escape of debris. If at any time the seal becomes stretched, loose, or deformed, a new seal strip 20 is to be installed in order to maintain a proper seal.

Each pin stopper 22 is disposed in a dovetail slot 14 coinciding with a cooling slot 12 having the seal strip 20 extending therefrom. The metal pin stoppers 22 are disposed between the portion of the seal strip end extending from the cooling slot 12 and the dovetail slot 14. Disposing the metal pin stopper 22 at this location requires the seal strip 20 to bend radially outward, away from the cooling slot, wherein the seal strip 20 is pressed against the edge of the cooling slot 12 thus forming a sealed off and isolated cooling slot region between the metal pin stopper/seal strip interfaces.

Figure 3:
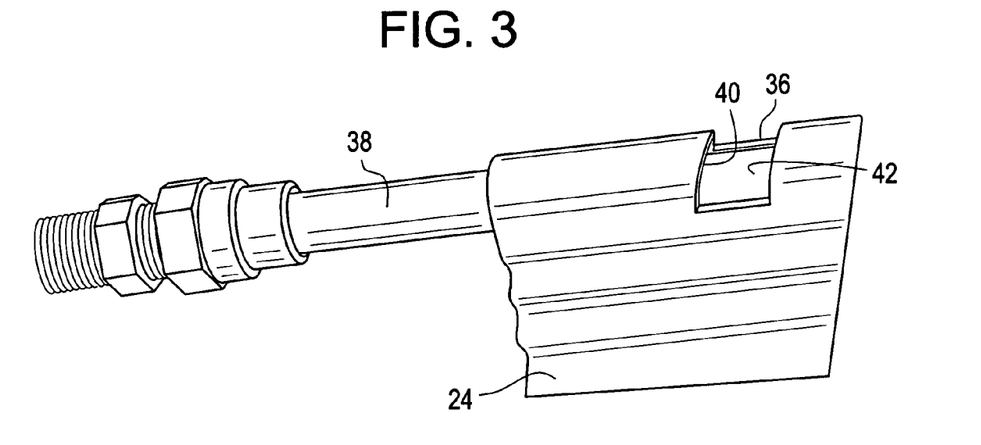
FIG. 3 is a perspective view of a vacuum assembly for debris removal incident the removal of material from the turbine wheel.

With reference again to FIG. 1, vacuum assemblies 24 may be viewed from a vantage point outside of the work area. An opposite side of one of the assemblies 24 is illustrated in FIG. 3 for a better understanding thereof. The assembly 24 has a dovetail shape which is sized and configured to engage in the dovetail slot 14 of the turbine wheel 10. The dovetail seal assemblies are disposed in the dovetail slots 14 that are not being modified. The dovetail seal assemblies have a notch 36 which aligns with the cooling slot 12 of the dovetail slot 14 into which the dovetail seal assembly 24 is installed. The dovetail seal assembly 24 further includes a vacuum tube 38, disposed in communication with passage 40 within the dovetail seal assembly 24. The vacuum tube 38 is configured with a cutout portion 42 that corresponds with the dovetail seal assembly notch 36 allowing the vacuum tube 38 to be in fluid communication with the notch 36. The vacuum tube is connected to a vacuum source (not shown), which provides a suction to the sealed off cooling slot 12 section. The dovetail seal assemblies, together with the seal strip 20 and the power tool cover 32 provide for a sealed off section of the turbine wheel 10, which allows the vacuum to draw away chips resulting from the material removal (i.e. grinding, blending, dressing, surfacing, etc.) operation.

Figure 4:
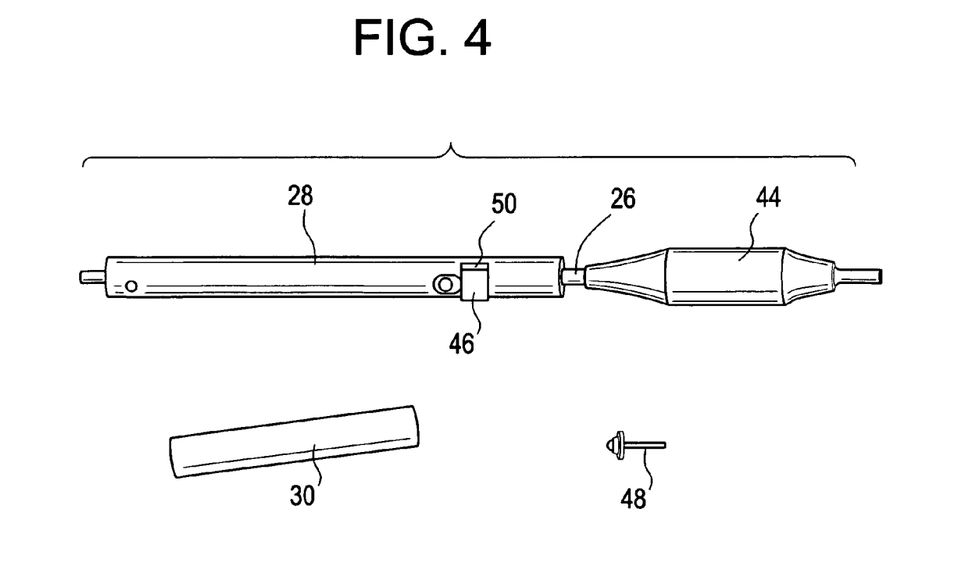
FIG. 4 is a perspective view of a hand held power tool assembly for use in accordance with an embodiment of the invention.

In order to achieve efficiency in the above described operation, it is helpful to have a hand held power tool 26 configured specifically for the task. FIG. 4 illustrates an exemplary hand held power tool assembly having a hand held power tool 26, a power tool rod 28, and a motor 44. The hand held power tool 26 may be, for example a rotary tool having a laterally acting head, which may be a ninety-degree head 46 as illustrated. The hand held power tool 26 further includes a tool bit 48 inserted into the head 46 wherein the tool bit 48 contacts and modifies the desired area. The hand held power tool 26 is used to remove sharp edges, nicks, scratches, etc. from the cooling slot edges by removing material, using a blending or grinding operation for example, from the cooling slot 12 edges. The hand held power tool 26 further allows for the replacement of tool bits 48 (shown detached), which may for example allow for different radius cuts corresponding to a rough pass or a finish pass with the hand held power tool 26.

The power tool rod 28 and hand piece 30 are attached to the hand held power tool 26 to support and aid in the operation of the hand held power tool 26. The power tool rod 28 has a cylindrical shape and further includes a notch cutout 50 wherein the tool bit 48 of the hand held power tool 26 projects through upon attachment to the power tool rod 28. When the hand held power tool 26, power tool rod 28, and hand piece 30 are installed within the dovetail slot 14 to perform the modification on the cooling slot 12, the notch cutout 50 is to be aligned with the cooling slot 12 to provide proper positioning of the tool bit 48 with respect to the areas to be modified. An electric motor 44, connected to a power supply 34, is also attached to the hand held power tool 26 for driving tool bit 48 rotation.

Figure 5:
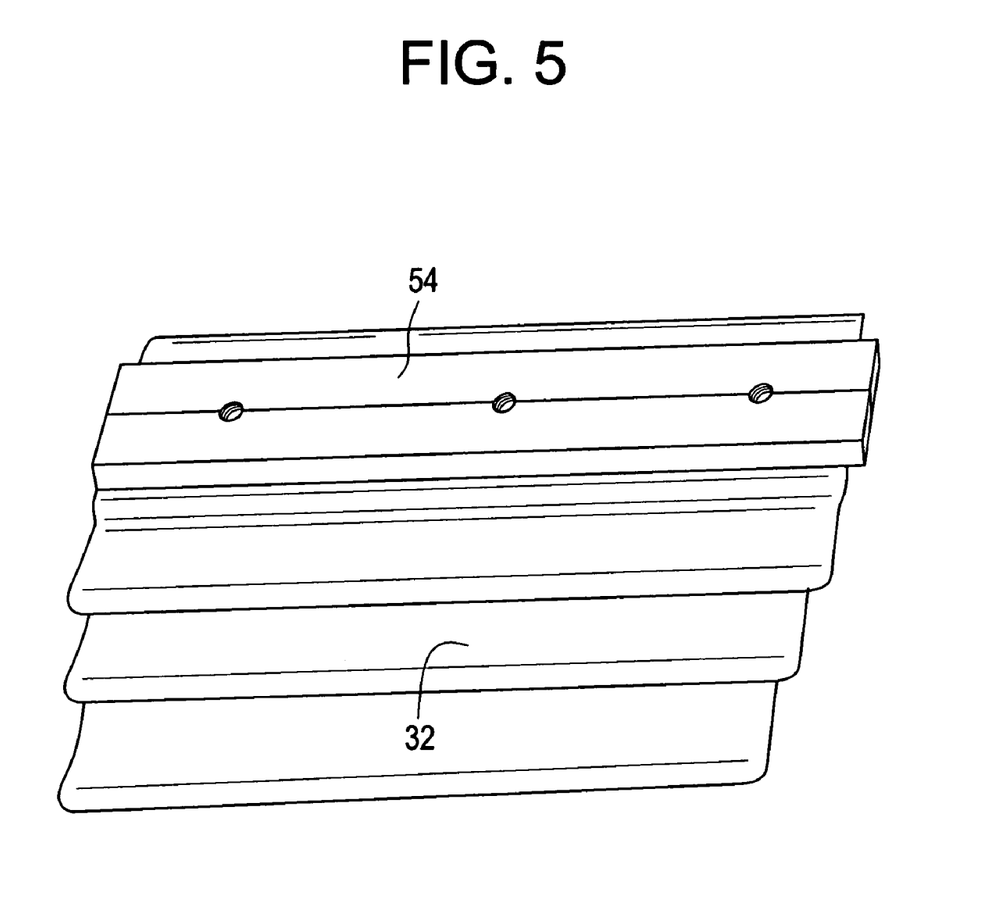
FIG. 5 is a perspective view of a power tool cover for use in accordance with an embodiment of the invention.

FIG. 5 illustrates the power tool cover 32 as viewed from a vantage point outside of the work area. An opposite side of the power tool cover 32 is shown for a better understanding thereof. The power tool cover 32 has a shape calculated to facilitate insertion and retention to a dovetail slot 14 of the turbine wheel 10. The power tool cover 32 is inserted in to the dovetail slot 14 that is to be modified and retains the hand held power tool 26 and power tool rod 28 within the dovetail slot 14. In other words, the power tool cover 32 fits over the hand held power tool 26 and power tool rod 28 within the dovetail slot 14 and restricts radial motion of the hand held power tool 26 and power tool rod 28. The power tool cover 32 further includes a metal shim 54, disposed at the inner periphery, which is in contact with the power tool rod 28 and provides radial support to the power tool rod 28 thus allowing for proper alignment and positioning. The metal shim 54 allows for a sliding contact point between the power tool cover 32 and power tool rod 28. Providing radial support to the power tool rod 28 thus results in hand held power tool 26 operational motions in the axial and circumferential directions within the dovetail slot 14.

Figure 6:
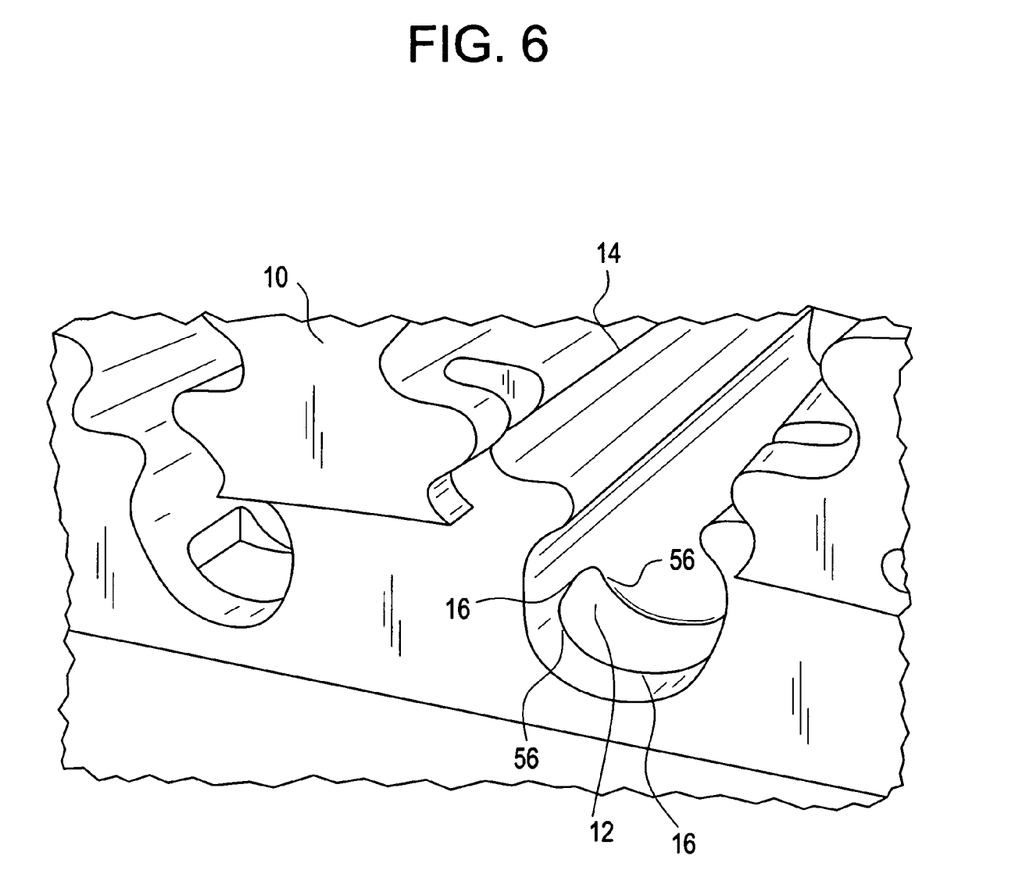
FIG. 6 is an enlarged view of a cooling slot region of a turbine wheel.

FIG. 6 illustrates a cooling slot 12 after having been modified by the system and method disclosed herein. The slot 12 exhibits in this condition a plurality of slot radii 56 located along the cooling slot edges 16. Inspections of the modified cooling slot 12 may be performed to ensure enough material has been removed and radius tolerances have been maintained. As stress concentrations are reduced at locations provided with radiused edges, the chances of meeting the original design life, of the turbine wheel, will be improved. Inspections may be performed by using appropriate inspection equipment (i.e. go-no go gauges, calipers, dial indicators, etc.) configured to measure the cooling slot 12 dimensions.

After surfacing and inspection is complete, the cooling slot 12 is cleaned by a suitable vacuum nozzle (not shown) before removing the seal strip 20 to make sure no chips are left within the cooling slot 12 or other portions of the turbine wheel 10.

Figure 7:
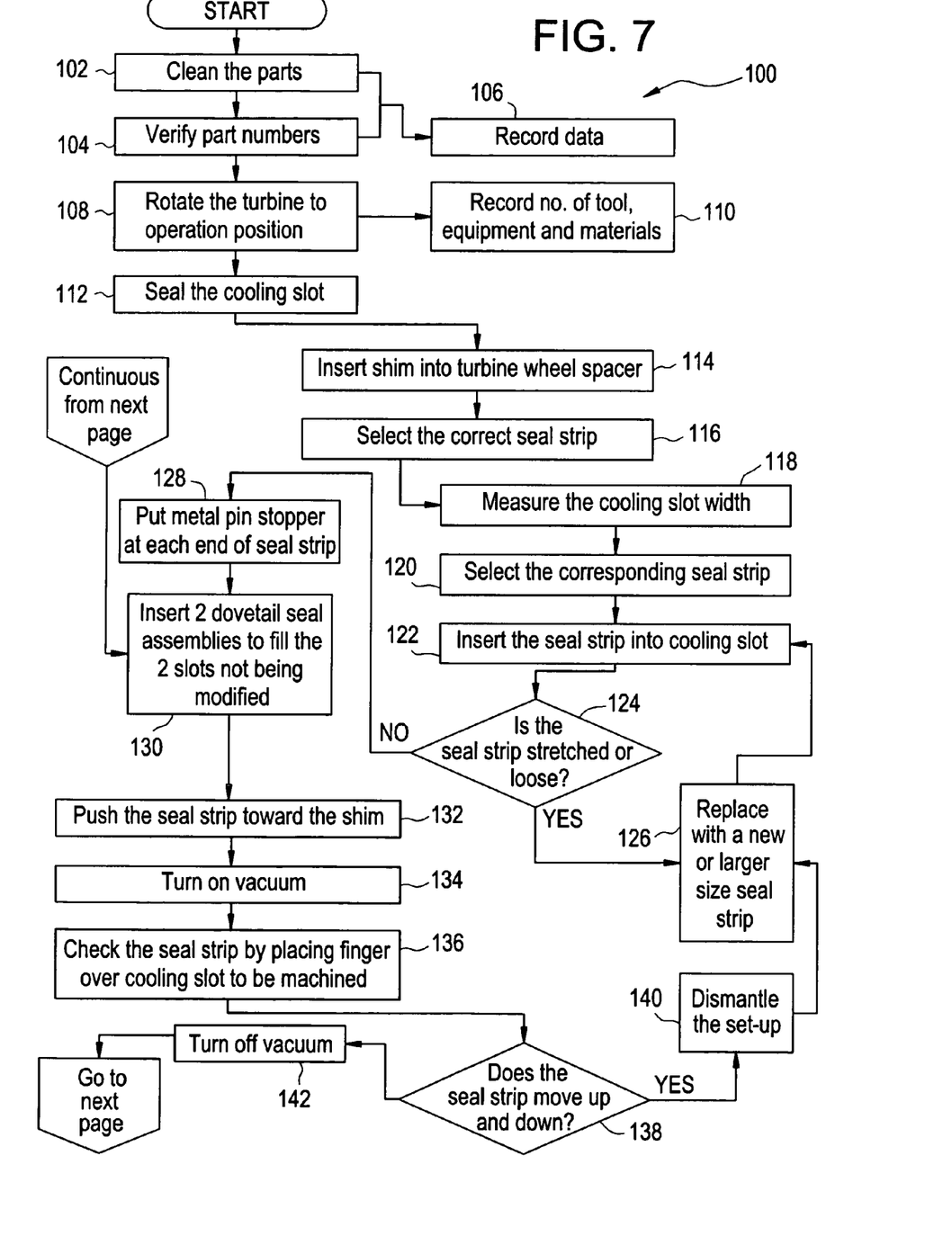
FIG. 7 is a first half of a flow chart of an exemplary method for material removal from a turbine wheel in accordance with an embodiment of the invention; and, FIG. 8 is a second half of a flow chart of an exemplary method for material removal from a turbine wheel in accordance with an embodiment of the invention.
Figure 8:
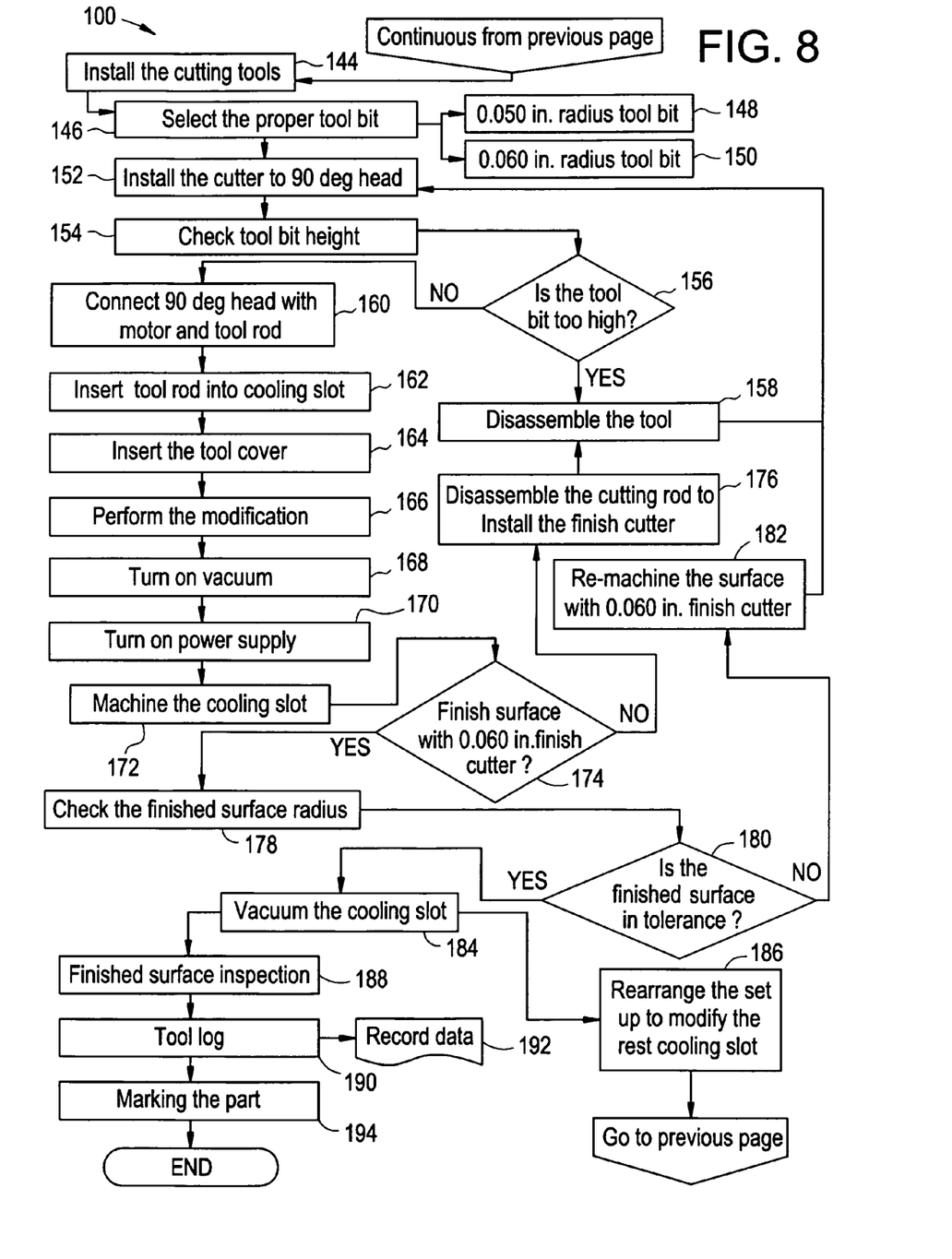

FIGS. 7 and 8 illustrate an exemplary method 100 for removing material from the turbine wheel 10. The method begins with cleaning the parts to be operated on (step 102). The part number of the component to be machined is then verified (step 104). Data may be recorded (step 106) at the completion of these steps. The turbine wheel 10 is then rotated to a preferable position (step 108), for example a position having the cooling slots to be machined located between the 8-11 o'clock position, depending on operator preference, allowing for a desired position of the dovetail slots 14 to be modified. The number of tools, equipment, and materials are then recorded (step 110) for inventory and quality purposes.

Sealing of the cooling slot 12 (step 112) is performed by inserting the shim 18 into the inner periphery of the turbine wheel 10 (step 114). Selecting the correct sealing strip (step 116) is performed by measuring the width of the cooling slot 12 (step 118) and then determining the corresponding seal strip 20 (step 120) based on the measurement results. The seal strip 20 is then inserted into the cooling slot 12 (step 122), which may require the use of a tool to aid in proper positioning of the seal strip 20. The seal strip 20 is then to be checked for stretching or a loose fit (step 124). If the seal strip 20 is stretched or loose, the seal strip 20 is to be replaced with a new or larger size seal strip 20 (step 126). If the seal strip 20 is not stretched or loose, then the metal pin stoppers 22 are installed at each end of the seal strip 20 (step 128).

The two dovetail seal assemblies 24 are then inserted into the adjacent dovetail slots 14 not being machined (step 130). The seal strip 20 may need to be again pushed towards the shim (step 132) to ensure there is a proper seal. Next, the vacuum is turned on (step 134) to draw a suction and the seal strip 20 is checked for a proper seal by placing a finger over the cooling slot 12 to be machined (step 136). If the seal strip 20 moves up and down as a result of placing the finger over the cooling slot 12 (step 138), then the seal strip 20 will need to be removed (step 140) and replaced with another seal strip 20 (step 126). If the seal strip 20 does not move up and down, then a proper seal has been verified and the vacuum can be turned off (step 142).

Installation of the hand held power tool 26 (step 144) is next performed by first selecting a proper tool bit size (step 146). The tool bit selected for the first pass may be, for example a roughing tool bit with a 0.050 in. radius (step 148) and the tool bit selected for a finishing pass may be, for example a 0.060 in. radius tool bit (step 150). The tool bit is then installed into the hand held power tool 26 (step 152). A tool bit height that will not damage the seal strip 20 and aligns with the areas to be modified is desirable. Next, the tool bit height needs to be verified (step 154). If the tool bit height is too high (step 156), then the tool bit will be disassembled form the hand held power tool 26 (step 158) and then assembled again as described earlier beginning with step 152. If the tool bit height is appropriate, then the 90-degree head hand held power tool 26 may be attached to the power tool rod 28 and connected to the motor (step 160). The hand held power tool 26 and power tool rod assembly is now placed into the dovetail slot 14 (step 162) to be modified and aligned with the cooling slot 12 wherein the tool bit tip is inserted inside the cooling slot 12. The power tool cover 32 is then inserted in to the dovetail slot 14, on top of the power tool rod 28 (step 164).

Performing the modification (step 166) on the turbine wheel 10 is then started by turning on the vacuum (step 168) and turning on the power supply (step 170). Next, the cooling slot 12 is machined by hand operation of the hand held power tool assembly (step 172). Axial and circumferential translations of the hand held power tool assembly are performed in order to remove material and modify the cooling slot 12. If the hand operation of the hand held power tool assembly is not a finish pass (step 174), then the power tool rod 28 is removed from the hand held power tool 26 in order to replace the tool bit (step 176). If the hand operation of the hand held power tool assembly was performed with a finish tool bit installed (step 174) then the machined area is to be inspected (step 178). If the inspection results are not acceptable (step 180), the cooling slot 12 is to be machined a second time with the finish tool bit installed (step 182). If the inspection results are acceptable, then the cooling slot 12 is to be vacuumed (step 184). If there are more cooling slots to be machined within the current set-up, then rearrangement of the set-up is required (step 186) by returning to step 130. If all of the cooling slots to be machined within the existing set-up have been operated on, then a visual surface inspection is performed (step 188).

Once the modifications are completed on all of the desired cooling slots, the tool log is updated (step 190) to ensure nothing is left inside the turbine case, appropriate data (i.e. quantities of materials used, etc.) is recorded (step 192), and the turbine wheel 10 is re-marked with the modified part number (step 194).

It will be appreciated that steps 102-110 and 190-194 are optional with regards to a method for removing material from a turbine wheel and are included only for clarity and completeness of exemplary maintenance procedures.

Additionally, although the figures show three cooling slots modified in one set up having two dovetail seal assemblies and one power tool cover, it should be noted that the number of cooling slots to be modified during one set up and the number of dovetail seal assemblies and power tool covers used in one set up may be varied according to specific applications.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system for removing material from a turbine wheel cooling slot comprising:
   a tool capable of removing material;
   a dovetail seal assembly located within a dovetail slot in operable communication with the turbine wheel to evacuate debris caused by removing material with said tool; and,
   a power tool cover engageable with the wheel and supportive of the tool.

2. The system of claim 1 wherein the power tool cover further comprises a shim in contact with the tool.

3. The system of claim 1 wherein the turbine wheel further comprises a cooling slot and the system further comprises a seal strip disposed within the cooling slot.

4. The system of claim 3 further comprising a metal pin disposed adjacent to the seal strip.

5. The system of claim 1 wherein the dovetail seal assembly further comprises an internal passage in communication with a vacuum source.

* * * * *